(12) United States Patent  
Touzard et al.

(10) Patent No.: US 11,667,169 B2  
(45) Date of Patent: Jun. 6, 2023

(54) SPRING ELEMENT, IN PARTICULAR JOUNCE BUMPER, FOR A VEHICLE SUSPENSION

(71) Applicant: BASF Polyurethanes GmbH, Lemfoerde (DE)

(72) Inventors: Anthony Touzard, Lemfoerde (DE); Josef Heidemann, Lemfoerde (DE)

(73) Assignee: BASF Polyurethanes GmbH, Lemfoerde (DE)

( * ) Notice: Subject to any disclaimer, the term of this patent is extended or adjusted under 35 U.S.C. 154(b) by 0 days.

(21) Appl. No.: 17/615,819

(22) PCT Filed: Jun. 3, 2020

(86) PCT No.: PCT/EP2020/065345  
§ 371 (c)(1),  
(2) Date: Dec. 1, 2021

(87) PCT Pub. No.: WO2020/245196  
PCT Pub. Date: Dec. 10, 2020

(65) Prior Publication Data  
US 2022/0281277 A1    Sep. 8, 2022

(30) Foreign Application Priority Data  
Jun. 3, 2019  (EP) ..................... 19177983

(51) Int. Cl.  
*B60G 11/22*    (2006.01)  
*B60G 11/24*    (2006.01)

(52) U.S. Cl.  
CPC ........ *B60G 11/24* (2013.01); *B60G 2202/143* (2013.01); *B60G 2204/125* (2013.01); *B60G 2204/4502* (2013.01); *B60G 2206/42* (2013.01)

(58) Field of Classification Search  
CPC .......... B60G 7/04; B60G 11/22; B60G 11/24; B60G 2202/143; B60G 2204/125;  
(Continued)

(56) References Cited

U.S. PATENT DOCUMENTS 2,951,674 A    9/1965   Rice  
6,619,635 B1*  9/2003   Hilburger .............. F16F 9/0463  
                                         267/64.23

(Continued)

FOREIGN PATENT DOCUMENTS

DE       1272049      7/1968  
DE       20311242     9/2003  
WO       2018/000017  1/2018

OTHER PUBLICATIONS

International Search Report dated Aug. 10, 2020 in PCT/EP2020/065345, 4 pages.

(Continued)

*Primary Examiner* — Christopher P Schwartz  
(74) *Attorney, Agent, or Firm* — Grüneberg and Myers PLLC

(57) ABSTRACT

A spring element, in particular a jounce bumper, for a vehicle suspension contains a longitudinal axis, a base body extending along the longitudinal axis, and an end portion positioned on a base end of the base body. The base body is elastically deformable between an uncompressed basic state and a compressed state in which the base body is at least partially compressed in the direction of the longitudinal axis. The end portion is configured for mounting the base body in a mounting cap. It is suggested that the end portion contains a plurality of at least two radially extending retention elements that are spaced apart from one another in the direction of the longitudinal axis, and each of the retention (Continued)

elements are configured to engage a mating retention element provided on the mounting cap.

19 Claims, 6 Drawing Sheets

(58) Field of Classification Search
    CPC ......... B60G 2204/4502; B60G 2206/42; F16F 1/371; F16F 1/373; F16F 1/3713; F16F 1/3716
    USPC .... 267/33–35, 139, 140, 219, 220, 292–294
    See application file for complete search history.

(56) References Cited

U.S. PATENT DOCUMENTS

| | | | |
|---|---|---|---|
| 10,920,843 B2* | 2/2021 | Thye-Moormann | F16F 1/3713 |
| 2002/0011343 A1 | 1/2002 | Iida | |
| 2002/0121793 A1* | 9/2002 | Rice | F16F 15/08 296/35.1 |
| 2016/0089952 A1* | 3/2016 | Kato | F16F 9/58 29/896.91 |
| 2019/0136929 A1* | 5/2019 | Thye-Moormann | B60G 11/22 |

OTHER PUBLICATIONS

Written Opinion dated Aug. 10, 2020 in PCT/EP2020/065345, 6 pages.

* cited by examiner

SPRING ELEMENT, IN PARTICULAR JOUNCE BUMPER, FOR A VEHICLE SUSPENSION

CROSS-REFERENCE TO RELATED APPLICATIONS

This application is the National Stage entry under § 371 of International Application No. PCT/EP2020/065345, filed on Jun. 3, 2020, and which claims the benefit of priority to European Application No. 19177983.4, filed on Jun. 3, 2019. The content of each of these applications is hereby incorporated by reference in its entirety.

BACKGROUND OF THE INVENTION

Field of the Invention

The invention relates to a spring element, in particular jounce bumper, for a vehicle suspension. The invention furthermore relates to a jounce bumper assembly having such a spring element, and to a vehicle, in particular a passenger motor vehicle having such a jounce bumper assembly.

Description of Related Art

Spring elements of the aforementioned type are generally known. They are used in cars, for example inside the chassis. They are used in particular as vibration-damping spring elements. In addition to the main spring, which is frequently based on metal springs and/or compressed gas elements, use is virtually always made of additional spring elements, preferably composed of resilient material. These spring elements are customarily hollow bodies which are formed concentrically and have different diameters and/or wall thicknesses along the spring axis. In principle, these spring elements could also act as main springs, but they frequently take on an end stop function in combination with the main spring. They influence the force-travel characteristic of the sprung wheel here by the formation or reinforcement of a progressive characteristic of the vehicle suspension. The pitching effects of the vehicle can thus be reduced and the rolling support reinforced. In particular, the starting rigidity is optimized by the geometrical configuration; this has a crucial effect on the suspension comfort of the vehicle. This function increases the driving comfort and ensures a very high degree of driving safety. The specific configuration of the geometry results in virtually constant component properties over the service life.

In operation, the spring element is compressed from an uncompressed basic state along its longitudinal axis into an at least partially compressed state, thereby dissipating energy by deforming. As has been explained above, the initial stages of the deformation of the spring element determine how soft the spring is perceived. Thus, minimal resistance is desired at the initiation of deformation. Since the overall impact forces on the spring element are significant in vehicle operation, however, the spring element needs to withstand substantial loads, thus leading to a demand for a progressive increase in stiffness and, most importantly, for proper retention of the spring element in the mounted position regardless of loads.

Along with the requirements mandated by the driving characteristics of vehicles, the design of the spring element, in particular in case of a jounce bumper, needs to withstand a considerable number of load cycles over its lifespan. Undesired separation of the spring element from the mounting position must be prevented. In the prior art, several ways of fastening jounce bumpers to the vehicle have been discussed in the past, among them the use of adhesives, negative fit and positive fit designs. There is, however, a constant desire to improve upon the stability of the connection of the spring element to the vehicle without sacrificing ease of installation and the durability of the spring element.

SUMMARY OF THE INVENTION

It was therefore an object of the invention to provide a spring element which overcomes the challenges of the prior art as much as possible. In particular, it was an object of the invention to suggest an alternative design of such a spring element. Further in particular, it was an object of the invention to suggest a spring element with improved retention in its mounting position without sacrificing damping behavior.

The invention achieves the object by suggesting a spring element of the initially mentioned type comprising a longitudinal axis and a base body extending along the longitudinal axis, the base body being elastically deformable between an uncompressed basic state and a compressed state in which the base body is at least partially compressed in the direction of the longitudinal axis, and an end portion configured for mounting the spring element to a mounting cap, wherein the end portion comprises at least two radially extending retention elements that are spaced apart from one another in the direction of the longitudinal axis, and each of the retention elements being configured to engage a mating retention element provided on the mounting cap.

DETAILED DESCRIPTION OF THE INVENTION

Figure 1:
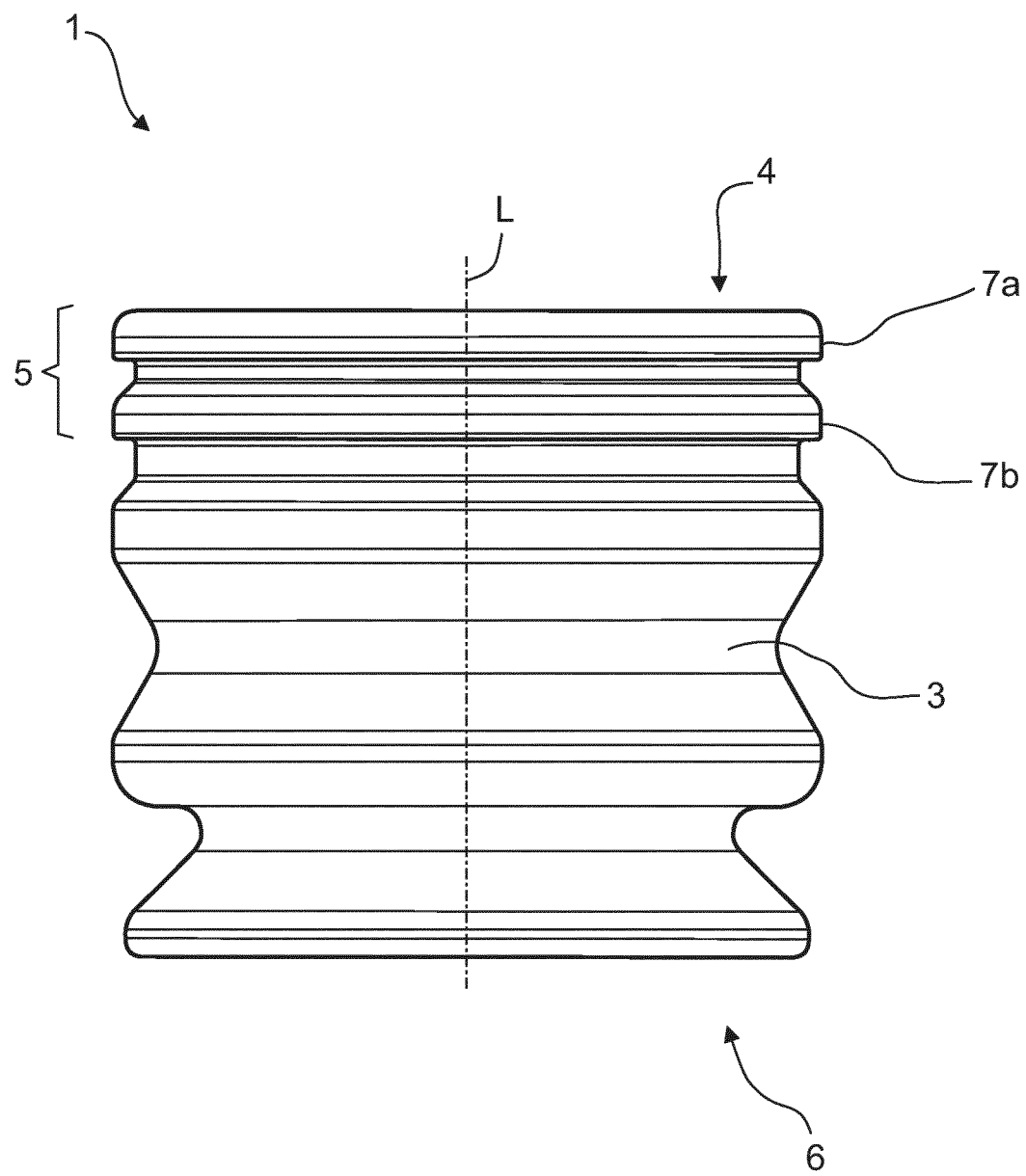
FIG. 1 shows a schematic side view of a spring element according to a preferred embodiment.

With regard to the invention, the term "compressed in the direction of the longitudinal axis" is to be understood as encompassing any compression that causes a variation in length in the direction of the longitudinal axis. This can either be a strictly linear compression movement of the spring element, but also a compression movement that follows a path that is angled with respect to the longitudinal axis and that may be a straight path or a curved path, e.g. a circular path, and consequently is defined by a first movement component in the direction of the longitudinal axis and a second movement component perpendicular thereto.

While the use of one single retention element on the base body designed for engaging the mounting cap in a positive fit or a negative fit has been known in the art, the invention is based upon the realization that providing a second retention element which is axially spaced apart from the first retention element, and providing a correspondingly positioned retention element on the mounting cap, vastly improves the retention capability of the mounting cap and the spring element when together. The use of two or more axially spaced-apart retention elements is surprisingly beneficial for the overall characteristics of the damper despite previous technical preconceptions that due to its deformation in the axial direction, the relative position in the axial direction of more than one retention element would not be stable in the long run, since the spacing between the retention elements would vary on the base body when the latter is compressed, but not in the mounting cap.

The invention has revealed that this preconception was unfounded and the spring element, according to the invention, is very reliably held in place in the mounting cap by the plurality of axially spaced-apart retention elements. According to the invention, the term "retention" is understood to be present when the retention elements engage one another in a way that increases the force necessary to pry the base body away from the mounting cap. In particular, retention in the sense of the invention requires more than mere frictional engagement between the base body and the mounting cap.

Particularly preferred, the mating relationship between the retention elements is such that one type of retention elements, for example the ones on the base, is formed as a protrusion while the other type retention elements, in the given example thus the ones formed on the mounting cap, is formed as a recess having dimensions, i.e. length in the longitudinal direction of the base body and depth perpendicular to the longitudinal direction, such as to accommodate the protrusion.

In a preferred embodiment, the mating retention elements are configured to engage one another in a positive fit. Particularly, the mating retention elements are configured such that the retention elements provided on the base body are elastically deformable between an uncompressed basic state and a compressed state. Further preferably, the retention elements provided on the mounting cap are configured so that when engaging the retention elements of the base body, the retention elements of the base body are in the compressed state. In other words, the retention elements of the base body are preferably oversized when compared to the mating retention elements. This has a particular benefit in that during operation, little to no gaps form between the retention elements, thus contributing to a snug fit and reliable retention.

Preferably, at least one of the retention elements is formed as a protrusion, such as a lip extending along the circumference of the base body. The mating retention element on the mounting cap thus preferably comprises a space such as a recess, configured to house the retention element in the mounted position.

A lip extending along the entire circumference of the base body is beneficial, since the orientation of the base body is then no longer a factor for correct mounting. Ease of installation is improved as a consequence.

In a further preferred embodiment, at least one of the retention elements is formed as a number of radially protruding (lip) segments, each segment extending along only a portion of the circumference of the base body. The segments are preferably spaced apart in the circumferential direction from one another. The mating retention element on the side of a mounting cap may either be formed as a corresponding number of segmented recesses, each capable of housing one respective segment only, or may as well be formed as one continuous circumferentially extending recess in which all segments can be accommodated. Segmenting of the retention elements allows for easier installation, since the segments will be allowed to move radially inwards when installed in the mounting cap, and will be allowed to snap back into the mating retention element, once in position.

Particularly preferred, one retention element is formed as a protrusion extending along the full circumference of the base body (i.e. fully around the base body), and another retention element is formed as a plurality of protruding segments, each segment extending along a portion of the circumference of the base body.

In a further preferred embodiment, both retention elements are formed as protrusions extending fully around the base body.

The term "circumferential" is to be understood to refer to the circumference of the base body. The term "circumferential direction" refers to a direction along the circumference, perpendicular to the longitudinal axis, and includes circular circumferences as well as non-circular circumferences.

In a further preferred embodiment, one retention element is positioned at the base end of the base body.

Preferably, at least one of the retention elements defines a first flank facing the base end and a second flank facing away from the base end. Herein, the first flank preferably comprises a chamfered surface portion. Alternatively or additionally, the second flank preferably comprises a surface portion that is extending radially with respect to the longitudinal axis, or that is undercut. By having the flank facing the base end being chamfered, the retention element can slide radially inwards when being pushed against the mounting cap during installation with more ease. In contrast, having the second flank being parallel to a radial line towards the longitudinal axis, or by angling the flank in an undercut, the retention element will cause greater resistance against removal of the base body from the mounting cap.

Preferably, at least one flank, and further preferably each flank, defines a contact surface for engaging the respective other retention element wherein the contact surface extends in a plane perpendicular to the longitudinal axis and has a size of 2.5 $mm^2$ or more, preferably 3.0 $mm^2$ or more.

In a further preferred embodiment, the flank or flanks facing away from the base end, i.e. the flanks having the contact surfaces, are oriented at an angle in the range of 45° to 135° relative to the longitudinal axis of the base body.

Further preferably, the mounting cap comprises, for each retention element, a contact flank facing the second flank of the retention element, wherein the contact flank of the mounting cap and the second flank of the base bodies' retention elements abut against each other when the base body of the spring element is mounted in the mounting cap.

Further preferably, the mounting cap comprises a further contact flank facing the first flank of each retention element, wherein also the further contact flank of the mounting cap engages the first flank of each retention element when the spring element and the mounting cap are in the mounted state.

In a further preferred embodiment, the base body comprises an outside surface, the retention elements protrude from the outside surface and connect to the base body through a transition radius, respectively, wherein the transition radius is preferably in a range of 0,1 or greater, further preferably 0.2 mm or greater, still further 0.3 mm or greater. The smooth transition provided by the radius from the outside surface of the base body to the retention elements increases durability of the spring element.

In a further preferred embodiment, the retention elements comprise a peripheral surface, and a chamfered surface connects to the peripheral surface through a transition radius, said radius preferably being in a range of 0.1 mm or greater, preferably 0.2 mm or greater, further preferably 0.3 mm or greater.

Again, the transition radius enhances the durability of the spring element over its lifecycle. Also, the transition between the chamfered flank and the peripheral surface of each retention element facilitates mounting of the spring element in the mounting cap enormously.

In a further preferred embodiment, the base body is partly or completely composed of an elastomer that is compressible in volume, preferably of a cellular polyisocyanate polyaddition product.

The base body here can be composed of an elastomer, but it can also be composed of a plurality of elastomers which are present in layers, in shell form or in another form or also in a mixture with one another. The polyisocyanate polyaddition products are preferably constructed on the basis of microcellular polyurethane elastomers, on the basis of thermoplastic polyurethane or from combinations of said two materials which may optionally comprise polyurea structures.

Microcellular polyurethane elastomers which, in a preferred embodiment, have a density according to DIN 53420 of 200 kg/m3 to 1100 kg/m3, preferably 300 kg/m3 to 800 kg/m3, a tensile strength according to DIN 53571 of 2 N/mm2, preferably 2 N/mm2 to 8 N/mm2, an elongation according to DIN 53571 of 300%, preferably 300% to 700%, and a tear strength according to DIN 53515 of preferably 8 N/mm to 25 N/mm are particularly preferred.

The elastomers are preferably microcellular elastomers on the basis of polyisocyanate polyaddition products, preferably having cells with a diameter of 0.01 mm to 0.5 mm, particularly preferably 0.01 to 0.15 mm.

Elastomers on the basis of polyisocyanate polyaddition products and the production thereof are known in general and described numerously, for example in EP A 62 835, EP A 36 994, EP A 250 969, DE A 195 48 770 and DE A 195 48 771.

Production customarily takes place by reacting isocyanates with compounds which are reactive to isocyanates.

The elastomers on the basis of cellular polyisocyanate polyaddition products are customarily produced in a mold in which the reactive starting components are reacted with one another. Suitable molds here are generally customary molds, for example metal molds, which, on the basis of their shape, ensure the three dimensional shape according to the invention of the spring element. In one embodiment, the contour elements are integrated directly in the casting mold; in a further embodiment, they are retrospectively incorporated into the concentric basic body. In a preferred embodiment, the concentric spring element is cooled for this purpose until it solidifies, preferably with liquid nitrogen, and processed in this state.

The polyisocyanate polyaddition products can be produced according to generally known methods, for example by the following starting substances being used in a single or two stage process:
 (a) isocyanate,
 (b) compounds reactive to isocyanates,
 (c) water and optionally
 (d) catalysts,
 (e) blowing agents and/or
 (f) auxiliary and/or additional substances, for example polysiloxanes and/or fatty acid sulfonates.

The surface temperature of the inner wall of the mold is customarily 40° C. to 95° C., preferably 50° C. to 90° C. The production of the molded parts is advantageously carried out at an NCO/OH ratio of 0.85 to 1.20, wherein the heated starting components are mixed and brought in a quantity corresponding to the desired molded part density into a heated, preferably tightly closing molding tool. The molded parts are cured for 5 minutes to 60 minutes and then can be removed from the mold. The quantity of the reaction mixture introduced into the molding tool is customarily dimensioned in such a manner that the molded bodies obtained have the density already presented. The starting components are customarily introduced into the molding tool at a temperature of 15° C. to 120° C., preferably of 30° C. to 110° C. The degrees of compression for producing the molded bodies lie between 1.1 and 8, preferably between 2 and 6. The cellular polyisocyanate polyaddition products are expediently produced according to the "one shot" method with the aid of high pressure technology, low pressure technology or in particular reaction injection molding technology (RIM) in open or preferably closed molding tools. The reaction is carried out in particular by compression in a closed molding tool. The reaction injection molding technology is described, for example, by H. Piechota and H. Rohr in "Integralschaumstoffe", Carl Hanser-Verlag, Munich, Vienna 1975; D. J. Prepelka and J. L. Wharton in Journal of Cellular Plastics, March/April 1975, pages 87 to 98 and U. Knipp in Journal of Cellular Plastics, March/April 1973, pages 76-84.

Hereinabove, the invention was described in a first aspect relating to the spring element itself.

In a second aspect, the invention, however, also relates to a jounce bumper assembly having a mounting cap and a spring element mounted in the mounting cap. In this assembly, the mounting cap preferably acts as a spacer in between a vehicle suspension assembly and the spring element itself.

The invention achieves the initially mentioned object according to this aspect in that the spring element is formed in accordance with any one of the preferred embodiments described hereinabove under the first aspect, and the mounting cap comprises a number of corresponding retention elements that matingly correspond to and are in engagement with the retention elements of the spring element.

The benefits and preferred embodiments of the spring element of the first aspect are at the same time also benefits and preferred embodiments of the jounce bumper assembly of the second aspect, which is why reference is made to the statements hereinabove to avoid unnecessary repetition.

In a further aspect, the invention relates to a vehicle, comprising a number of vehicle suspensions, wherein at least one of the suspensions, and preferably some or all of the suspensions comprise a jounce bumper assembly as described in the preferred embodiments hereinabove. Again, the benefits and preferred embodiments of the spring element and jounce bumper assembly of the first/second aspects are at the same time also benefits and preferred embodiments of the vehicle, which is why reference is again made to the statements hereinabove to avoid unnecessary repetition.

Figure 2:
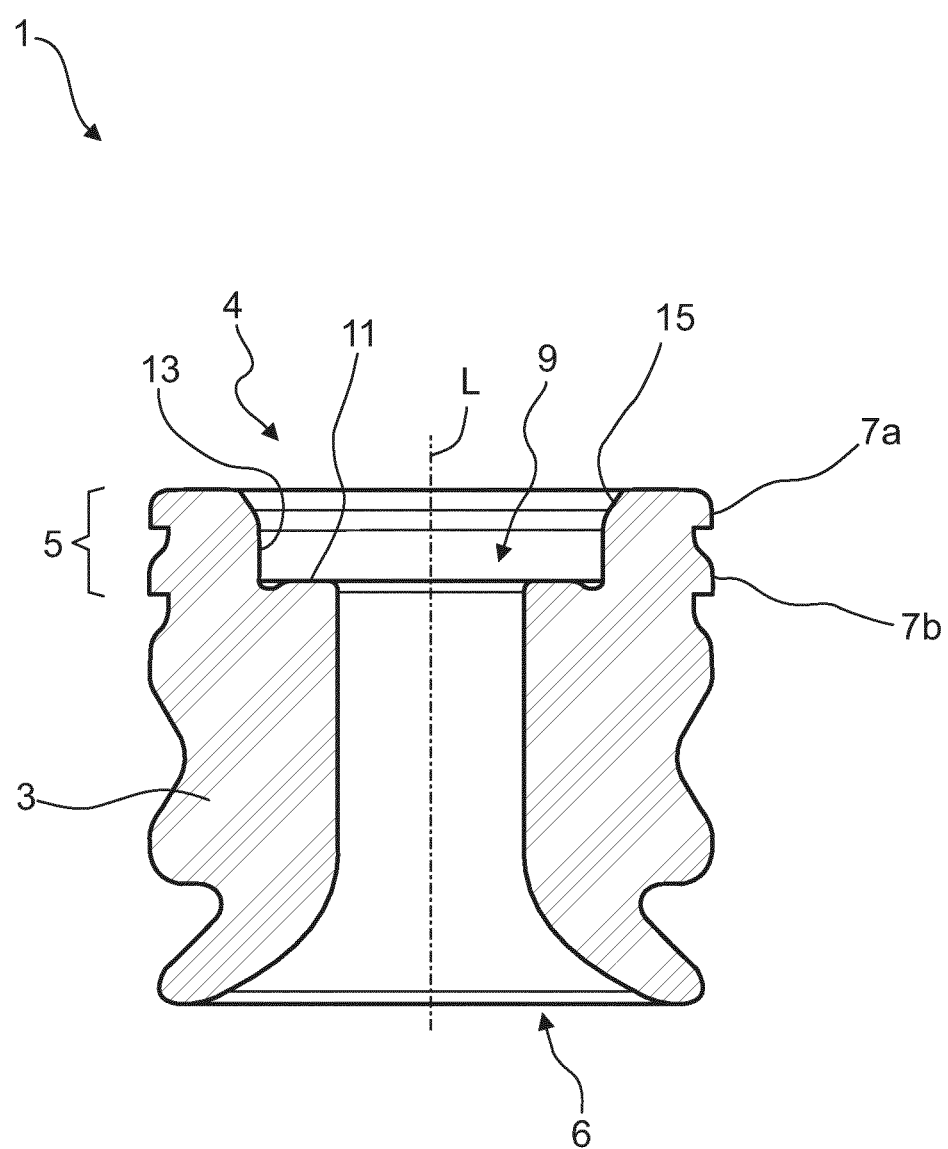
FIG. 2 shows a schematic cross sectional view through the spring element of FIG. 1.
Figure 3:
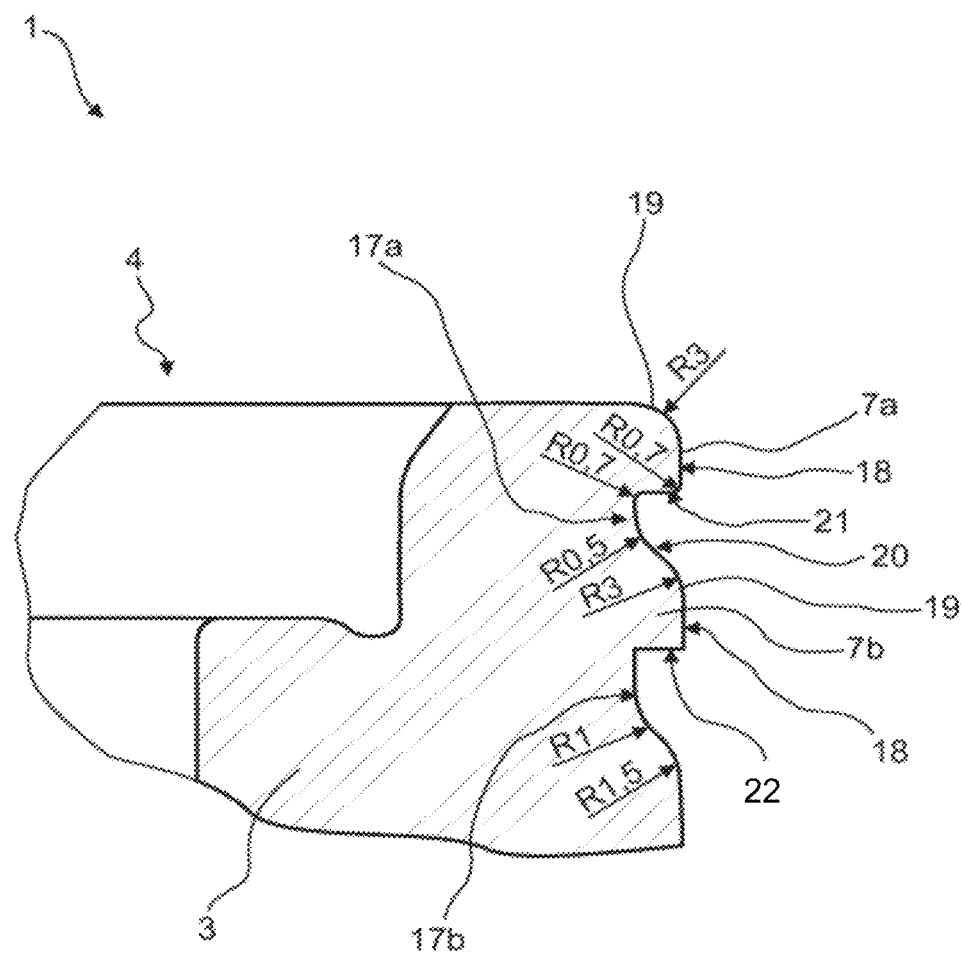
FIG. 3 shows a schematic detail view of the spring element shown in FIG. 2.

The invention will hereinafter be described in more detail with reference to the accompanying drawings of a preferred embodiments herein, FIG. 1 shows a schematic side view of a spring element according to a preferred embodiment, FIG. 2 shows a schematic cross sectional view through the spring element of FIG. 1, FIG. 3 shows a schematic detail view of the spring element shown in FIG. 2, and FIGS. 4A-4C show schematic representations of a jounce bumper assembly having a spring element as shown in FIGS. 1-3.

A spring element 1 is shown in FIG. 1. The spring element 1 comprises a longitudinal axis L along which a base body 3 extends. The base body 3 is shown in the uncompressed base state.

The base body 3 comprises a base end 4 and a tip end 6. The base end 4, in operation, faces towards a vehicle structure to which the spring element 1 is mounted either immediately or through other parts. The tip end 6, in operation, faces a damper cap or similar element which causes compression of the spring element upon impact.

Figure 4A:
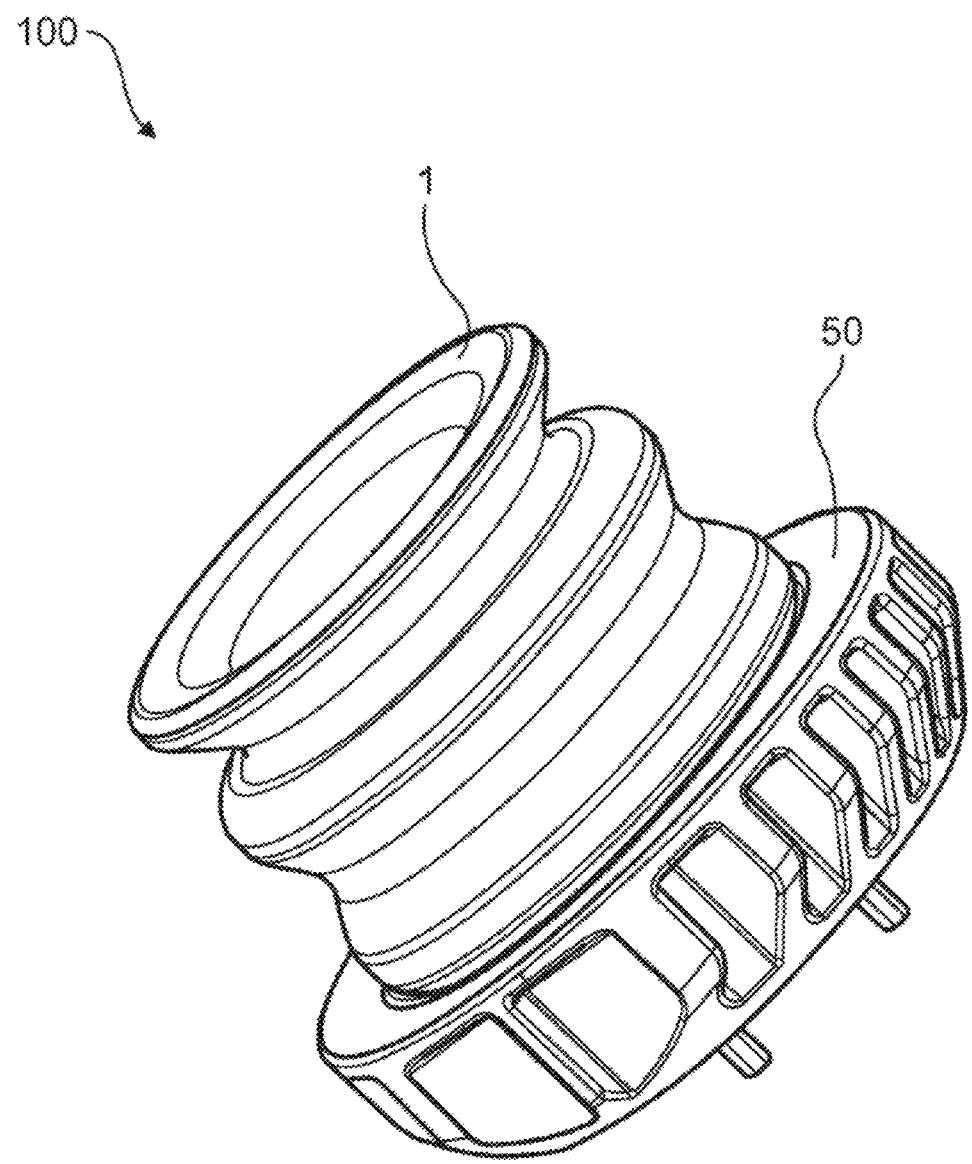
FIG. 4A shows a schematic representation of a jounce bumper assembly having a spring element as shown in FIGS. 1-3.
Figure 4B:
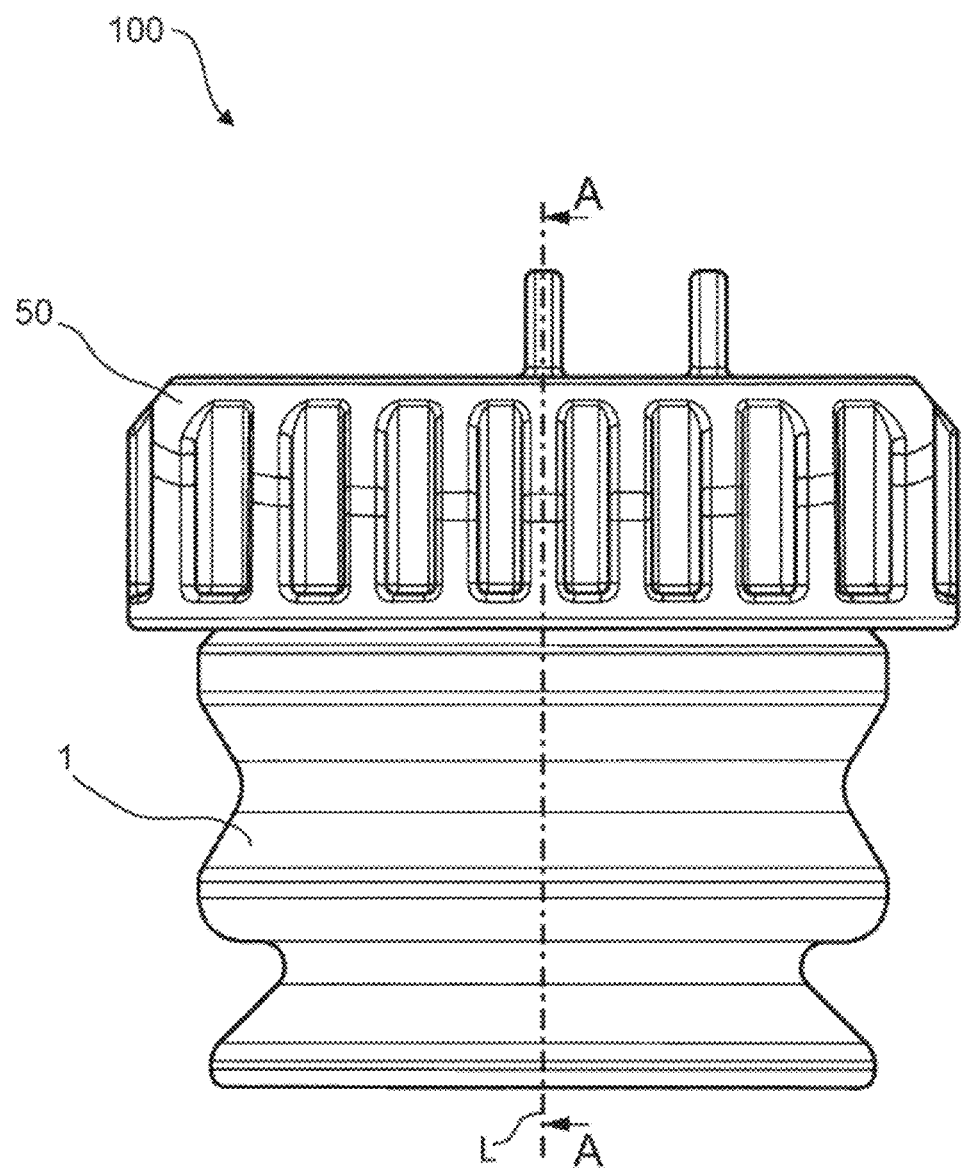
FIG. 4B shows another schematic representation of a jounce bumper assembly having a spring element as shown in FIGS. 1-3.
Figure 4C:
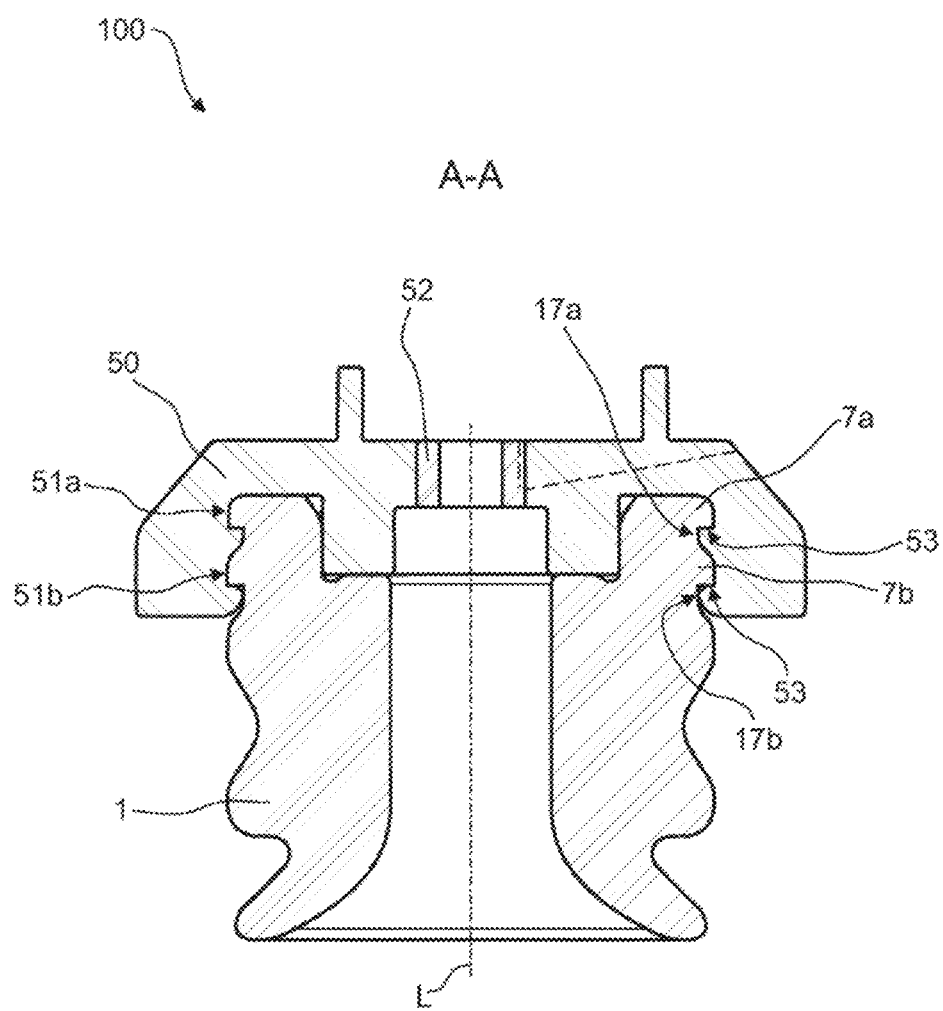
FIG. 4C shows cross sectional view of the jounce bumper assembly in FIGS. 4A and 4B.

On the side of the base end 4, the base body 3 comprises an end portion 5 configured from mounting the spring element 1 to a mounting cap (cf. FIGS. 4A-4C).

The end portion 5 comprises a plurality of retention elements 7a, b that are axially spaced apart from one another in the direction of the longitudinal axis L. In the exemplary embodiment shown in FIGS. 1-3, the retention elements 7a, 7b are both formed as singular protrusions, or lips, which extend along the entire circumference of the base body 3. It would however also be within the scope of the invention if one or both of the retention elements 7a, b were formed as segmented protrusions wherein each segment only extends along a portion of the circumference of the base body 3 and in which the segments are preferably spaced apart from one another in the circumferential direction.

As can be seen in FIG. 2, the base body 3 comprises a recess 9 extending from the base end 4 through to the tip end 6. The recess 9 comprises a stepped inner diameter having a first stop shoulder 11 and a cylindrical side wall 13. The stop shoulder 11 and cylindrical side wall 13 are configured to receive and centre a mounting cap (cf. FIGS. 4A-4C). The recess on the base end 4 further comprises an inclined insertion surface, preferably having a conical or tapered surface portion which facilitates the installation of the spring element 1 on the mounting cap (cf. FIGS. 4A-4C).

As can be seen from FIG. 3, the retention elements 7a, 7b comprise a diameter which is optimized for easy installation and at the same time stable retention functionality. The first retention element 7a is located on the base end 4 of the spring element 7. The second retention element 7b is spaced apart from the base end 4 and from the first retention element 7a in the direction of the longitudinal axis L (see FIGS. 1 and 2).

The first retention element 7a comprises a peripheral surface 18 and a transition radius 19 providing a smooth transition between the peripheral surface 18 and the base end 4.

The second retention element 7b also comprises a peripheral surface 18, preferably having the same diameter as the peripheral surface 18 of the first retention element 7a. Facing the base end 4, the second retention element 7b comprises a first flank 20 which comprises a chamfered surface portion facing the base end 4. The angle of the chamfer preferably is in a range between 15° and 60° with respect to the longitudinal axis, allowing the retention element 7b to be deflected and/or deformed radially inwards when pushing the spring element 1 into the mounting cap. The first retention element 7a is also able to deflect and/or deform radially inwards by virtue of the transition radius 19.

Both retention elements 7a, b comprise a second flank (21, 22) facing away from the base end 4. In the embodiment shown, the second (21, 22) flank is oriented perpendicular to the longitudinal axis, i.e. parallel to a radial line towards the longitudinal axis L (cf. FIGS. 1, 2). Alternatively, it would be within the scope of invention to have the second flank (21, 22) formed as an undercut.

The second retention element 7b comprises a transition radius 19 in between the first flank 20 and the peripheral surface 18. Further preferably, both retention elements 7a, b also comprise a transition radius from the peripheral surface 18 to the second flank (21, 22).

The first retention element 7a and the second retention element 7b are spaced apart in the axial direction by a cylindrical wall section 17a. Relative to the peripheral surfaces 18 of the retention elements 7a, 7b which are formed as projections from the base body 3, the surface portion 17a defines a recess. Facing away from the second flank 22 of the second retention element, the base body 3 comprises a further cylindrical portion 17b, which, again relative to the peripheral surfaces 18 of the retention elements 7a, 7b is formed as a recess.

The function of recesses 17a, 17b is to provide space for corresponding protrusions formed on a mounting cap so that the mounting cap and the spring element 1 can enter a positive engagement (cf. FIGS. 4A-4C). The surface portions 17a, 17b in the shown embodiment comprise a cylindrical surface portion, but need not necessarily be cylindrical as far as the invention is concerned. The surface portions 17a, b might in fact also include non-cylindrical surface portions or might be entirely non-cylindrical, i.e. convex, concave or conical, or be formed as a combination of several of these shapes. Their key function, which will be contemplated in the context of FIGS. 4A-4C, is providing the volume necessary for the interengagement of the corresponding retention elements 7a,b of the spring element 1 on the one hand side and the mounting cap on the other hand side.

While the FIGS. 1-3 mainly show the spring element 1 and details thereof in isolation, FIGS. 4A-4C illustrate the inventive use of the spring element 1 of FIGS. 1-3 in a jounce bumper assembly 100. The jounce bumper assembly 100 comprises the spring element 1 mounted into a mounting cap 50 as shown in FIG. 4A. The mounting cap 50 preferably is made partially or completely of a polymer, such as a thermoplastic material, for example polyoxymethylene (POM), or partially of completely made of metal. The outer contour of the mounting cap 50, which preferably acts as a spacer between the vehicle structure (not shown) and the spring element 1 may be substantially cylindrical or may be oblong, depending on the space constraints of the mounting environment of the jounce bumper assembly 100.

A cross sectional view through the jounce bumper assembly of FIGS. 4A, 4B is shown in FIG. 4C. From FIG. 4C it is apparent that in addition to the mounting cap 50 and the spring element 1, the jounce bumper assembly 100 also comprises a sleeve insert 52 that is added to the mounting cap 50 for installation purposes.

The mounting cap 50 comprises a first annular recess 51a and, spaced apart therefrom, a second annular recess 51b. The recesses 51a, b are configured to receive the first and second retention elements 7a, b of the spring element 1.

Likewise, the mounting cap 50 comprises a number of protrusions having a contact flank 53, respectively. The protrusions and contact flanks 53 are spaced apart from one another in the direction of the longitudinal axis L such that the retention elements 7a, 7b fit into the mounting cap 50, and such that the surface portions 17a, 17b adjacent to the retention elements 7a, 7b accommodate the protrusions having the contact flanks 53, and allow for a snug fit of the correspondingly shaped retention elements in the (shown) mounted state. The volume of the recesses 51a, b preferably is minimally smaller, at least in the axial direction (direction of the longitudinal axis L), as compared to the axial extension of the retention elements 7a, 7b, thus requiring a predetermined amount of compression of the retention elements 7a, 7b to ensure the proper fit inside the mounting cap 50.

While the embodiment shown in FIGS. 1-4C, for ease of understanding, only shows a jounce bumper assembly and spring element having exactly two retention elements spaced apart from one another in the direction of the longitudinal axis, the invention contemplates that also a higher number of retention elements may be present of the spring element and correspondingly on the mounting cap, with each retention element being spaced apart from other retention elements in the direction of the longitudinal axis L.

Also, while the figures only show the use of one-piece retention elements that extend along the entire circumference of the base body, respectively, it is within the invention that at least one, preferably each, retention element is composed of a plurality of segments that are spaced apart from one another in the circumferential direction, wherein the segments of one retention element are axially spaced apart from a second retention element, or a plurality of segments, for that matter.

The invention claimed is:

1. A jounce bumper assembly, comprising:
a mounting cap, and
a spring element for a vehicle suspension, comprising:
 a longitudinal axis and a base body extending along the longitudinal axis, the base body being elastically deformable between an uncompressed basic state and a compressed state in which the base body is at least partially compressed in the direction of the longitudinal axis, and
 an end portion positioned on a base end of the base body, said end portion being configured for mounting the base body in a mounting cap;
 wherein the end portion comprises at least two radially extending retention elements that are spaced apart from one another in the direction of the longitudinal axis, and the at least two radially extending retention elements are configured to engage at least two mating retention elements provided on the mounting cap to form a mating relationship,
 wherein the at least two mating retention elements are configured to engage one another in a positive fit,
 wherein the spring element is mounted in the mounting cap, and
Wherein the at least two mating retention elements are mated to and engaged with the at least two radially extending retention elements.

2. The jounce bumper assembly of claim 1, wherein one of the at least two radially extending retention elements is positioned at the base end of the base body.

3. The jounce bumper assembly of claim 2, wherein the at least two radially extending retention elements comprise a peripheral surface, and a chamfered surface connects to the peripheral surface through a transition radius.

4. The jounce bumper assembly of claim 3, wherein the transition radius is 0.1 mm or greater.

5. The jounce bumper assembly of claim 1, wherein at least one of the at least two radially extending retention elements defines a first flank facing the base end and a second flank facing away from the base end.

6. The jounce bumper assembly of claim 5, wherein the first flank comprises a chamfered surface portion.

7. The jounce bumper assembly of claim 5, wherein the second flank comprises a surface portion that extends radially with respect to the longitudinal axis or that is undercut.

8. The jounce bumper assembly of claim 1, wherein at least one of the at least two radially extending retention elements is formed as a number of segments, wherein each of the segments extends along a portion of a circumference of the base body.

9. The jounce bumper assembly of claim 8, wherein the segments are lip segments.

10. The jounce bumper assembly of claim 1, wherein the base body comprises an outside surface, and wherein the at least two radially extending retention elements protrude from the outside surface and connect to the base body through a transition radius.

11. The jounce bumper assembly of claim 10, wherein the transition radius is 0.1 mm or greater.

12. The jounce bumper assembly of claim 1, wherein the base body is partly or completely composed of an elastomer that is compressible in volume.

13. The jounce bumper assembly of claim 12, wherein the base body is partly or completely composed of a cellular polyisocyanate polyaddition product.

14. A vehicle, comprising:
a number of vehicle suspensions, wherein at least one of the vehicle suspensions comprises the jounce bumper assembly as claimed in claim 1.

15. The vehicle of claim 14, wherein each of the vehicle suspensions comprises the jounce bumper assembly.

16. The jounce bumper assembly of claim 1, wherein the mating relationship comprises a protrusion and a recess formed by one of each of the at least two radially extending retention elements and the at least two mating retention elements, wherein the recess is dimensioned to accommodate the protrusion.

17. The jounce bumper assembly of claim 1, wherein the spring element is a jounce bumper.

18. The jounce bumper assembly of claim 1, wherein the at least two radially extending retention elements are elastically deformable between an uncompressed basic state and a compressed state.

19. The jounce bumper assembly of claim 1, wherein the at least two radially extending retention elements are oversized when compared to the at leas two mating retention elements.

* * * * *

UNITED STATES PATENT AND TRADEMARK OFFICE
CERTIFICATE OF CORRECTION

| | |
|---|---|
| PATENT NO. | : 11,667,169 B2 |
| APPLICATION NO. | : 17/615819 |
| DATED | : June 6, 2023 |
| INVENTOR(S) | : Anthony Touzard and Josef Heidemann |

It is certified that error appears in the above-identified patent and that said Letters Patent is hereby corrected as shown below:

On the Title Page

Column 2, under U.S. PATENT DOCUMENTS, first entry reads "9/1965" and should read -9/1960-;

In the Claims

Column 9, in Claim 1, Line 51 reads "Wherein" and should read -wherein-;

Column 10, in Claim 19, Line 56 reads "at leas" and should read -at least-.

Signed and Sealed this
Third Day of October, 2023

Katherine Kelly Vidal
*Director of the United States Patent and Trademark Office*